No. 775,909. Patented November 29, 1904.

UNITED STATES PATENT OFFICE.

HAROLD BENTLEY ANDERSON, OF CLEVELAND, OHIO.

METHOD OF TREATING ROADS TO ALLAY DUST.

SPECIFICATION forming part of Letters Patent No. 775,909, dated November 29, 1904.

Application filed July 23, 1904. Serial No. 217,890. (No specimens.)

*To all whom it may concern:*

Be it known that I, HAROLD BENTLEY ANDERSON, of Cleveland, in the county of Cuyahoga and State of Ohio, have invented certain new and useful Improvements in Methods of Treating Roads to Allay Dust; and I hereby declare that the following is a full, clear, and exact description thereof, reference being had to the accompanying drawings, which form part of this specification.

My invention consists in a method of treating roads to allay dust, and has for its object to provide a method of road-surface treatment which will efficiently and economically render the road practically dustless.

Heretofore roads have been treated with oil with a view to dust prevention by distributing oil in unadulterated form upon or throughout the road-surface. This has usually been accomplished by plowing the road, saturating with oil, harrowing, and rolling or by furrowing the dust and feeding oil into the furrows. Either system of distribution has been open to objections, however, in that the unadulterated oil, by reason of the cohesion of its molecules, cannot be subdivided into quantities sufficiently minute to secure proper permeation of the dust and earth. Consequently the roads so treated are surcharged with oil in some spots and unaffected by the oil in others, and while the effect is to make the road seem unduly greasy the dust is not wholly laid.

My invention contemplates a method of road treatment which consists in emulsifying the oil with a suitable volatile agent—such, for instance, as water or water and ammonia—and distributing the emulsion upon the road in any suitable manner, as by sprinkling. The oil in emulsion is divided into globules much smaller than the oil drops obtainable by sprinkling or spraying unadulterated oil, and a very even distribution of the oil is effected. Good results I have found are attained by the use of an emulsion of five per cent. (5 %) oil to ninety-five per cent. (95 %) water, though I do not desire to limit myself to such exact proportions. After the emulsion is distributed the water and oil sink to some extent into the ground; but the water component finally evaporates, leaving the ground coated and permeated with a thin evenly-spread film of oil. Several treatments in the manner described gives to the road a hard dustless surface having asphalt-like qualities.

Having thus described my invention, what I claim is—

1. A method of treating roads which consists in distributing thereon a liquid comprising oil incorporated with a more volatile adulterant.

2. A method of treating roads which consists in distributing thereon an emulsion of oil and a more volatile carrying agent.

3. A method of treating roads which consists in sprinkling on the surface thereof an emulsion of oil and water.

4. A method of treating roads which consists in applying to the road-surface an emulsion containing a relatively small percentage of oil and a relatively large percentage of a more volatile carrying agent.

5. A method of treating roads which consists in sprinkling on the surface thereof an emulsion of oil and water wherein the amount of water is in excess of the amount of oil.

6. A method of obtaining an oil-coated surface for roads which consists in emulsifying the oil in a more volatile carrying agent and distributing the emulsion evenly upon the surface of the road.

In testimony that I claim the foregoing as my own I affix my signature in presence of two witnesses.

HAROLD BENTLEY ANDERSON.

In presence of—
FRANK W. ROSTOCK,
CHAS. B. SHANKS.